March 10, 1953
E. B. LEWIS
2,630,889
DETACHABLE BRAKE LINING ASSEMBLY
Filed Dec. 12, 1949
2 SHEETS—SHEET 1
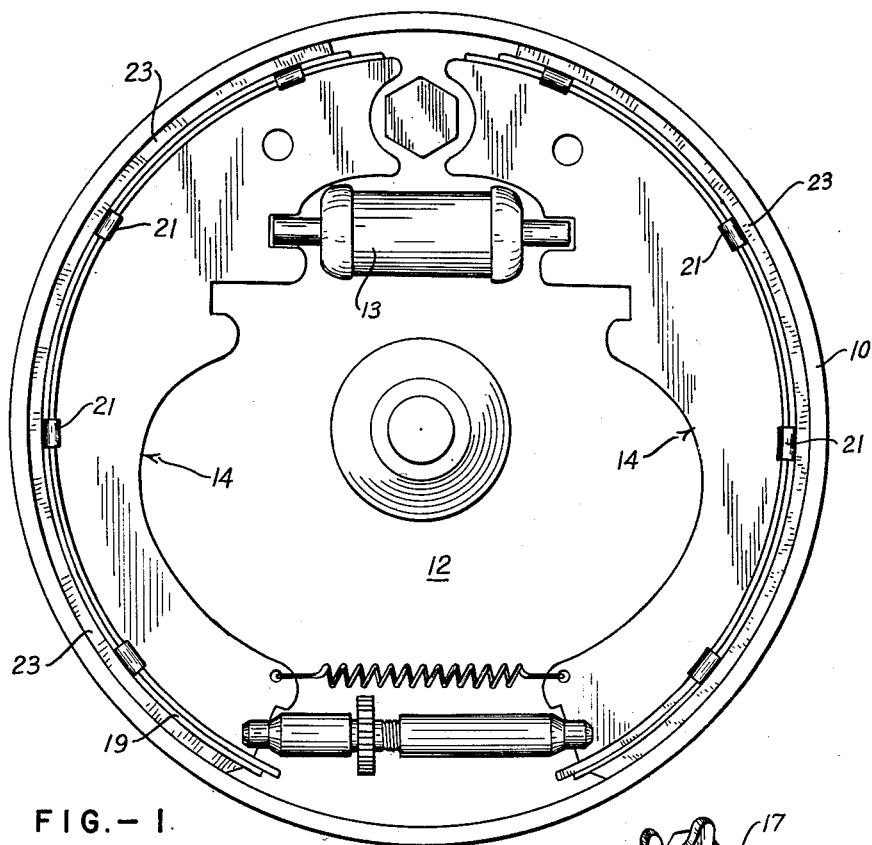
FIG.—1.
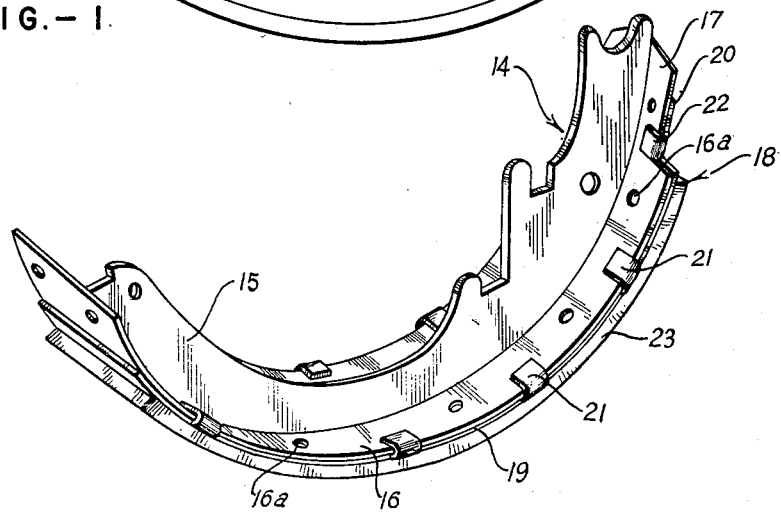
FIG.—2
INVENTOR.
Edward B. Lewis
BY
*H. A. McGrew*
ATTORNEY March 10, 1953 E. B. LEWIS 2,630,889
DETACHABLE BRAKE LINING ASSEMBLY
Filed Dec. 12, 1949 2 SHEETS—SHEET 2
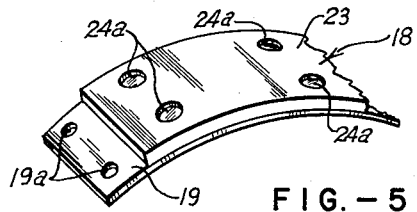
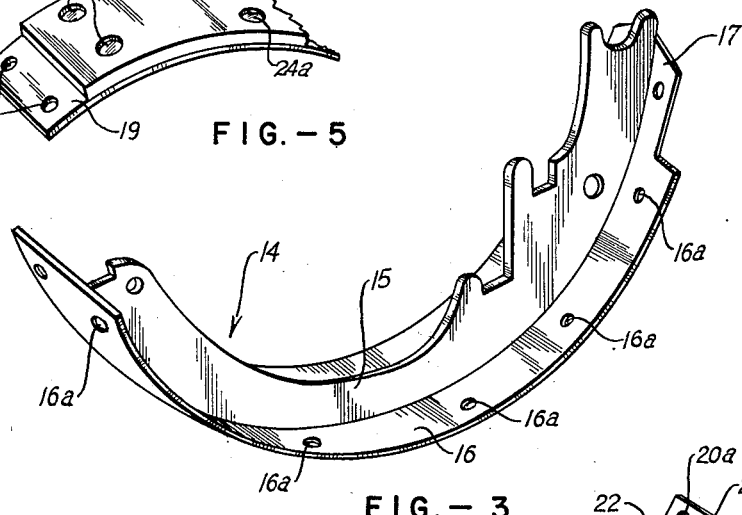
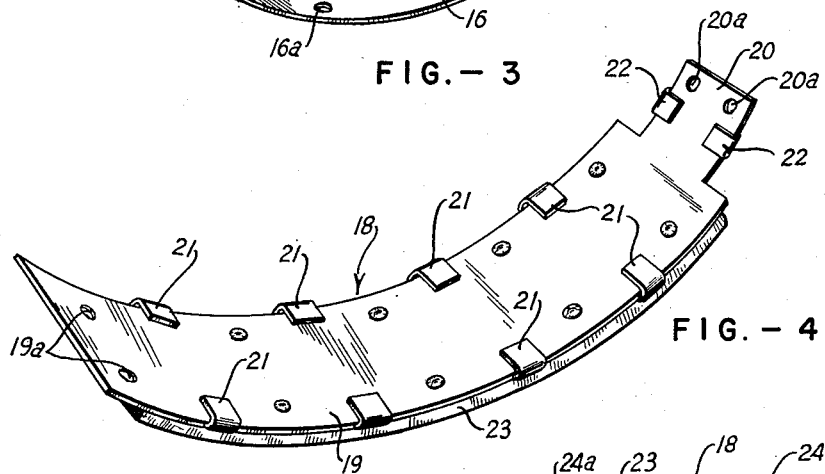
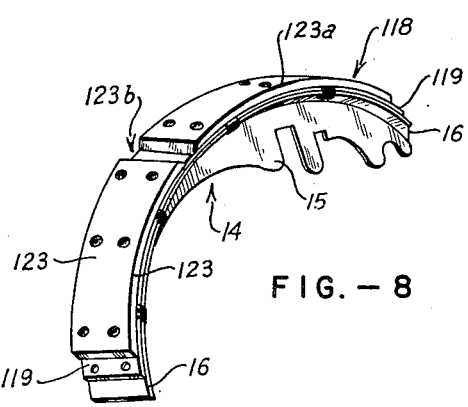
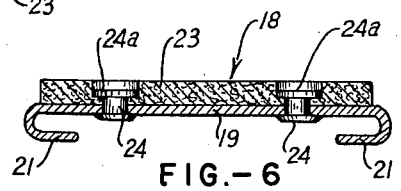
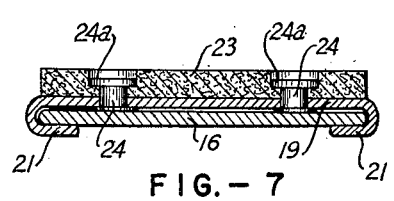
INVENTOR.
Edward B. Lewis
BY
ATTORNEY Patented Mar. 10, 1953

2,630,889

UNITED STATES PATENT OFFICE 2,630,889

DETACHABLE BRAKE LINING ASSEMBLY

Edward B. Lewis, Denver, Colo.

Application December 12, 1949, Serial No. 132,497

2 Claims. (Cl. 188—234)

The present invention relates to detachable brake lining assemblies. It has to do particularly, although not exclusively, with detachable brake lining units or assemblies for the brake shoes of motor vehicles, such as passenger cars, trucks, buses, etc., but it may have other uses of a more widespread nature.

One of the objects of the present invention is to provide a new and improved detachable brake lining unit or assembly which may be quickly and easily applied to a brake shoe and/or removed from the shoe, which has all of the advantages as to serviceability, durability, effectiveness and wearing qualities as that type of conventional brake lining which was attached by rivets directly to the brake shoe and which, as a result thereof, required a rather costly and time-consuming shop operation.

Another object of the present invention is to provide an improved detachable brake liner or assembly wherein the lining material is mounted upon and preferably riveted to a backing plate and wherein the backing plate is preferably pre-shaped to conform to the shape or curvature of a conventional brake shoe to which the unit or assembly is to be applied, and wherein the detachable brake liner or assembly is provided with novel means for applying it to or mounting it upon the brake shoe.

A further object of the present invention is to provide an improved detachable brake liner assembly or unit consisting of a metallic backing plate and brake lining material, in which the brake lining material is permanently secured to the backing plate by rivets whose outer heads are countersunk or spaced below the braking surface of the brake lining material; it being another object of the present invention to provide the metallic backing plate with spaced means along its side edges for removably mounting the unit or assembly upon a conventional brake shoe.

Another object of the present invention is to provide a detachable brake lining assembly or unit which includes a preferably pre-shaped or formed metallic backing plate having non-metallic brake lining material permanently affixed to the outer surface of the plate, in which the backing plate is of curved oblong shape having a projecting narrower tongue at one of its ends, and in which means are provided along the side edges of the oblong plate and the projecting tongue for removably mounting the unit or assembly upon a brake shoe.

A further object of the invention is to provide an improved quick-detachable brake lining unit or assembly in which the brake lining material is in two or more separated pieces or sections, giving greater flexibility to the unit for installation purposes and/or in use.

The foregoing and other objects and advantages of the present invention will appear from the following description and appended claims when considered in connection with the accompanying drawings forming a part of this specification wherein like reference characters designate corresponding parts in the several views.

In said drawings:

Fig. 1 is an elevational view looking into a vehicle brake assembly embodying the present invention;

Fig. 2 is a perspective view of one of the brake shoes of Fig. 1 having a detachable brake lining assembly or unit embodying the present invention mounted thereupon;

Fig. 3 is a perspective view of one of the more or less conventional brake shoes of the preceding views;

Fig. 4 is a perspective view of one of the brake lining assemblies or units embodying the present invention, being shown before application to a brake shoe, such as the shoe of Fig. 3;

Fig. 5 is a fragmentary perspective view of one end of the removable or detachable brake lining unit or assembly of Fig. 4;

Fig. 6 is a transverse vertical sectional view of the detachable unit or assembly before application to a brake shoe;

Fig. 7 is a view similar to Fig. 6 but showing the assembly mounted upon a brake shoe; and Fig. 8 is a fragmentary perspective view of a brake lining assembly embodying a somewhat modified form of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

The detachable brake lining assembly or unit of the present invention is preferably pre-shaped so as to properly fit conventional brake shoes of vehicle brakes. The unit or assembly will be made in several sizes adapted to fit standard or conventional brake shoes. Its base or backing plate will also be formed and shaped so as to conform generally to the size, shape and curvature of the brake shoe to which it is to be applied.

One of the important purposes of the invention is to supply repair shops, service stations, as well as various automotive parts distributors and other outlets with new and improved quick-detachable brake lining assemblies or units which may be quickly and easily applied to standard or conventional brake shoes without necessitating on-the-job riveting of brake lining material directly to brake shoes, as is the present practice. The brake lining assemblies or units will be sold ready for quick and easy application to conventional brake shoes without requiring the use of special tools or equipment. If the brake shoe to be relined happens to be one which has had brake lining directly riveted upon its outer surface, it is merely necessary to remove the worn lining and the rivets and then apply one of the detachable units or assemblies of the present invention.

With reference particularly to Fig. 1 of the drawings, there is shown a brake assembly and a portion of a vehicle wheel assembly which includes, as shown, a conventional brake drum 10 and a pair of more or less conventional brake shoes 14. The latter are mounted upon the circular backing plate 12 of the brake drum in conventional manner permitting their expansion and contracting by either a mechanically actuated cam (not shown) or by hydraulic pressure through the medium of a wheel cylinder, such as that shown at 13. The assembly illustrated in Fig. 1 is merely one form of assembly with which the brake lining units of the present invention may be employed. It is to be understood that the type of brake shoe may vary and the brake assembly may be of the type which employs two separate wheel cylinders (not shown) similar to wheel cylinder 13, as illustrated. In all respects, the brake assembly with which the present invention is used, may be of conventional nature. It is not believed necessary to illustrate or describe such an assembly in greater detail herein.

With particular reference to Figs. 2 and 4 through 7, there is shown in these figures one form of the improved brake lining assembly or unit embodying the present invention, which unit or assembly is adapted to be quickly and easily applied to or mounted upon a conventional brake shoe, such as that shown as a whole at 14 in Fig. 3 and which may be quickly and easily removed from the conventional brake shoe 14 when the brake lining material has become worn and ineffective.

Merely by way of example, the brake shoe 14 is shown as being provided with a central reinforcing web portion 15 secured to the undersurface of an oblong curved body portion 16 which, at one end, is shown as being reduced in width to provide an outwardly projecting portion or tongue-like extension 17. The web portion 15 is preferably formed with suitable notches or indentations and with holes or openings so that the shoe will fit properly within the brake assembly and cooperate and function with the other parts thereof in conventional manner. As shown, the body portion 16 of the brake shoe is provided with a series of rivet holes 16a simply for the reason that the shoe is, as stated, one of conventional type, in which the customary and usual manner of attaching brake lining is by riveting the lining directly to the shoe. These openings or holes 16a are, however, not needed for use when one of the improved brake lining assemblies or units embodying the present invention is installed upon it in the manner best illustrated in Figs. 2 and 7.

The brake lining assembly or unit embodying the present invention is illustrated in the drawings in two of its forms. With particular reference to Figs. 4, 5 and 6, one form of said unit, namely that shown as a whole at 18, preferably comprises a curved metallic oblong backing or base plate, or member 19 having at one end thereof a similarly curved projecting portion, extension, or tongue-like end 20. Disposed along the longitudinal side edges of plate 19 and in spaced relationship, is a series or plurality of clip-like members, fingers, or lugs 21. The tongue portion 20 also carries at its side edges, similar clip-like members or stop clips 22, adapted to engage the shoulders at the base of the tongue-like brake shoe extension 17, and properly position the brake lining unit with respect thereto, as clearly shown in Figure 2.

The backing or base plate 19 of the unit, as shown, is provided adjacent one end with a pair of holes or openings 19a and the tongue or projecting portion 20 may also be provided with a pair of similar holes or openings 20a. These holes may be aligned with similarly located holes in the body 16 of the brake shoe, being provided for the purpose of receiving suitable attaching means or members, such as small bolts or screws (not shown) for detachably securing the brake lining unit or assembly 18 to brake shoe 14.

The outer face or surface of the backing plate 19 has secured to it a strip or length of non-metallic brake lining material 23 which, as shown, is secured rigidly to the backing plate 19 by a plurality of rivets 24. As clearly seen in Figs. 5, 6 and 7, the rivets 24 which secure the lining 23 to backing plate 19 are preferably countersunk so that their heads 24a will be disposed considerably below the braking or contact surface of the lining 23. This arrangement, of course, permits long use of the lining material 23 before it becomes worn down sufficiently to expose the heads 24a of the rivets.

In order to apply the detachable or removable brake lining assembly or unit 18 to a brake shoe, such as shoe 14, the shoe is first removed from the brake assembly, whereupon the brake liner unit is engaged with the outer surface of the shoe and is slipped onto the shoe, with the result that the side or longitudinal edges of portion 16 of the brake shoe will be engaged or gripped by the clip-like members or inturned lugs or fingers 21 of the removable unit, with the similarly formed members 22 on tongue or extension 20 gripping the tongue portion 17 of the brake shoe. Thus, the parts will assume the positions in which they are best shown in Fig. 2 of the drawings. Suitable additional fastening means, such as small bolts or the like (not shown) may then be inserted through the holes or openings 19a and 20a to engage similar registering openings located adjacent opposite ends of the brake shoe, to hold the unit 18 securely upon the shoe and prevent its relative movement in use. The brake shoe, with its newly mounted liner assembly 18, may now be installed in the brake assembly, thus completing a quick and relatively easy brake relining job.

It is to be understood, as suggested above, that if the improved detachable lining assembly is being installed for the first time in a brake assembly wherein conventional lining means has been employed, it is merely necessary to first remove the worn lining and rivets from the conventional brake shoe and then attach one of the units of the present invention in a manner similar to that set forth above.

The particular shape and formation of the unit 18 will vary in accordance with the style of brake shoe with which it is to be employed. In other words, the unit will be supplied in several sizes and types so that it is merely necessary to select a replacement liner assembly for the particular type of brake shoe employed in the brake assembly.

While it is desirable to provide the inturned fingers or clip-like members 21 and 22, thus permitting the brake lining assembly to be applied to the brake shoe with a sliding operation, other means for mounting the unit may be provided. If desired, the fingers or members 21 and 22 may be rigid, or relatively so, as illustrated in the drawings, or they may be bendable so as to be capable of being shaped around the side edges of the brake shoe to hold the unit in gripping relationship upon the shoe. Moreover, any suitable means may be provided for insertion in or cooperation with the openings 19a and 20a of the removable lining unit and the corresponding openings formed in the brake shoe. It is merely desirable to provide some suitable means to prevent lengthwise relative movement of the brake lining unit on the brake shoe, as well as sidewise or lateral relative movement.

With particular reference to the modified form of the present invention as shown, by way of illustration in Fig. 8 of the drawings, the removable brake lining assembly or unit of this form is shown as a whole at 118, being mounted as explained above in connection with unit 18, upon the brake shoe which is shown as a whole at 14.

The brake lining assembly 118 has somewhat more flexibility than assembly 18 and comprises, as shown, a curved backing plate or metallic base 119, to the outer or convex face of which there is attached, by means of countersunk or depressed rivets (not shown) two similar pieces of brake lining material 123 and 123a. The so-called lower piece 123 is somewhat shorter than the other or so-called upper piece 123a of brake lining and the two pieces are slightly spaced apart, leaving the space 123b. If desired, and as shown, the opposed inner ends of liner sections 123 and 123a may be beveled. This particular type of brake lining unit is desirable for installation in brake assemblies wherein the brake drum is of large diameter and thus requires the use of extra large and long brake shoes. The break or space 123b will allow for greater flexibility of the base or backing plate or member 119. The construction is flexible for installation purposes on a brake shoe and is also flexible in use within the brake assembly.

I claim:

1. In combination with a brake shoe having a flange with a tongue portion of reduced width extending from only one end of the flange and square shoulders at the base of said tongue portion, a detachable brake lining unit comprising a rigid metallic backing plate corresponding in size and shape to the flange of said brake shoe and having a corresponding tongue portion at only one end thereof, a band of brake lining permanently affixed to said backing plate, rigid clip means provided along side edges of said backing plate and the tongue portion thereof, whereby the brake lining unit may be slidably engaged endwise to said shoe over the tongue end thereof, and registrable openings in the ends of said shoe and said backing plate adapted for the reception of fastening means, the edge clips on the tongue of said backing plate being positioned and adapted to effect exact registration of said openings by engaging said brake shoe shoulders.

2. A brake lining unit comprising a curved, rigid metallic backing plate of generally rectangular shape, a band of brake lining material permanently affixed to said backing plate, a tongue portion of reduced width extending integrally from only one end thereof, stop clips extending from the sides of said tongue portion immediately adjacent its juncture with the backing plate, clips provided along the side edges of said backing plate, and holes in each end of said unit adapted for the reception of fastening means.

EDWARD B. LEWIS.

REFERENCES CITED

The following references are of record in the file of this patent:

UNITED STATES PATENTS

| Number | Name | Date |
|---|---|---|
| 1,620,030 | Kries | Mar. 8, 1927 |
| 1,771,594 | Thompson | July 29, 1930 |
| 1,857,124 | Brackett | May 10, 1932 |
| 1,903,723 | Palmer | Apr. 11, 1933 |
| 2,027,823 | Hoffman | Jan. 14, 1936 |
| 2,037,109 | Berry et al. | Apr. 14, 1936 |
| 2,067,086 | Hoffman | Jan. 5, 1937 |
| 2,128,467 | Merritt | Aug. 30, 1938 |
| 2,153,341 | Ruffino | Apr. 4, 1939 |
| 2,161,762 | Hathaway et al. | June 6, 1939 |
| 2,328,738 | Nelson | Sept. 7, 1943 |

FOREIGN PATENTS

| Number | Country | Date |
|---|---|---|
| 203,356 | Great Britain | Sept. 7, 1923 |